(12) United States Patent
Salisbury et al.

(10) Patent No.: US 12,391,010 B2
(45) Date of Patent: Aug. 19, 2025

(54) METHODS OF MANUFACTURE FOR COMPOSITE BLADES

(71) Applicant: Raytheon Technologies Corporation, Farmington, CT (US)

(72) Inventors: George Alan Salisbury, East Hampton, CT (US); Royce E. Tatton, Shelley, ID (US)

(73) Assignee: RTX Corporation, Farmington, CT (US)

( * ) Notice: Subject to any disclaimer, the term of this patent is extended or adjusted under 35 U.S.C. 154(b) by 119 days.

(21) Appl. No.: 18/097,142

(22) Filed: Jan. 13, 2023

(65) Prior Publication Data

US 2024/0239057 A1 Jul. 18, 2024

(51) Int. Cl.
| | |
|---|---|
| *B29C 70/38* | (2006.01) |
| *B29C 70/34* | (2006.01) |
| *B29C 70/44* | (2006.01) |
| *B29C 70/54* | (2006.01) |
| B29K 105/08 | (2006.01) |
| B29L 31/08 | (2006.01) |
| F01D 5/28 | (2006.01) |

(52) U.S. Cl.
CPC .......... *B29C 70/382* (2013.01); *B29C 70/44* (2013.01); *B29C 70/545* (2013.01); *B29K 2105/0872* (2013.01); *B29L 2031/082* (2013.01); *F01D 5/282* (2013.01); *F05D 2230/20* (2013.01); *F05D 2300/603* (2013.01)

(58) Field of Classification Search
None
See application file for complete search history.

(56) References Cited

U.S. PATENT DOCUMENTS

| | | | |
|---|---|---|---|
| 3,943,020 A | 3/1976 | Ashton et al. | |
| 4,627,791 A | 12/1986 | Marshall | |
| 5,939,006 A | 8/1999 | Wang et al. | |
| 6,187,411 B1 * | 2/2001 | Palmer | B32B 5/024 |
| | | | 428/318.6 |
| 7,399,159 B2 | 7/2008 | Matheny et al. | |
| 7,731,816 B2 | 6/2010 | Oldani et al. | |

(Continued)

FOREIGN PATENT DOCUMENTS

| | | |
|---|---|---|
| CN | 102795338 | 11/2012 |
| CN | 113086169 | 7/2021 |

(Continued)

OTHER PUBLICATIONS

European Patent Office, European Search Report dated May 23, 2024 in Application No. 23213515.2.

*Primary Examiner* — Emmanuel S Luk
(74) *Attorney, Agent, or Firm* — SNELL & WILMER L.L.P.

(57) ABSTRACT

A method of manufacturing composite blades comprises: laying up a pre-impregnated composite material to form a pre-impregnated composite structure; vacuum bagging the pre-impregnated composite structure between a first pressure plate and a second pressure plate; consolidating and curing the pre-impregnated composite structure to form a fiber-reinforced composite structure; and machining an overlap portion of the fiber-reinforced composite structure to form a first fiber-reinforced composite blade and a second fiber-reinforced composite blade.

17 Claims, 7 Drawing Sheets

(56) References Cited

U.S. PATENT DOCUMENTS

| | | |
|---|---|---|
| 7,810,539 B2 | 10/2010 | Mischler et al. |
| 7,835,567 B2 | 11/2010 | Oldani |
| 8,052,819 B2 | 11/2011 | Munaux et al. |
| 8,151,854 B2 | 4/2012 | Oldani |
| 8,667,999 B2 | 3/2014 | Hamlyn et al. |
| 8,715,556 B2 | 5/2014 | Murakami et al. |
| 8,733,417 B2 | 5/2014 | Hamlyn et al. |
| 9,149,949 B2 | 10/2015 | Johnson et al. |
| 9,175,950 B2 | 11/2015 | Collis et al. |
| 9,193,140 B2 | 11/2015 | Johnson et al. |
| 9,527,237 B2 | 12/2016 | Benson et al. |
| 9,623,611 B2 | 4/2017 | Oldani |
| 9,782,926 B2 | 10/2017 | Witzel et al. |
| 10,059,067 B2 | 8/2018 | Vaniglia et al. |
| 10,125,617 B2 | 11/2018 | Jevons |
| 10,173,378 B2 | 1/2019 | Barton |
| 10,192,298 B2 | 1/2019 | Harding et al. |
| 10,265,908 B2 | 4/2019 | Inada et al. |
| 10,329,925 B2 | 6/2019 | Voleti et al. |
| 10,562,241 B2 | 2/2020 | Backhouse |
| 10,613,508 B2 | 4/2020 | Barnes |
| 10,821,713 B2 | 11/2020 | Sinha et al. |
| 10,953,613 B2 | 3/2021 | Zivkovic |
| 11,117,319 B2 | 9/2021 | Barnes et al. |
| 11,117,333 B2 | 9/2021 | Tingle |
| 11,135,787 B1 | 10/2021 | Grimshaw et al. |
| 11,141,937 B2 | 10/2021 | Boroughs et al. |
| 11,167,483 B2 | 11/2021 | Barnes et al. |
| 11,167,484 B2 | 11/2021 | Barnes et al. |
| 11,167,495 B2 | 11/2021 | Alfson et al. |
| 11,173,654 B2 | 11/2021 | Barnes et al. |
| 11,285,677 B2 | 3/2022 | Tingle et al. |
| 11,338,503 B2 | 5/2022 | Stranberg |
| 11,413,806 B2 | 8/2022 | Barnes et al. |
| 11,426,952 B2 | 8/2022 | Tingle |
| 11,440,273 B2 | 9/2022 | Gill |
| 2008/0216961 A1 | 9/2008 | Hamlyn et al. |
| 2010/0196637 A1* | 8/2010 | Lippert .............. F16C 7/026 428/36.1 |
| 2013/0011271 A1 | 1/2013 | Shi et al. |
| 2013/0309096 A1* | 11/2013 | Le Bras .............. B29C 66/8266 156/499 |
| 2015/0056081 A1* | 2/2015 | De Waal Malefijt ........ B29C 65/7847 156/500 |
| 2015/0328844 A1 | 11/2015 | Murakami et al. |
| 2016/0114540 A1 | 4/2016 | Hamlyn et al. |
| 2017/0043541 A1* | 2/2017 | Khan .................. B29C 70/345 |
| 2018/0050502 A1 | 2/2018 | Oldani |
| 2018/0154590 A1 | 6/2018 | Tingle |
| 2018/0304562 A1 | 10/2018 | Murakami et al. |
| 2018/0370158 A1* | 12/2018 | Gallier ................ B29C 70/545 |
| 2019/0249684 A1 | 8/2019 | Kuroki et al. |
| 2019/0277141 A1* | 9/2019 | Gill ...................... B29C 53/382 |
| 2019/0315075 A1* | 10/2019 | Gill ...................... B29C 70/545 |
| 2019/0353599 A1 | 11/2019 | Zivkovic |
| 2020/0361164 A1 | 11/2020 | Caffiau et al. |
| 2021/0017089 A1 | 1/2021 | Thrasher et al. |
| 2021/0388726 A1 | 12/2021 | Churcher et al. |
| 2022/0126528 A1 | 4/2022 | Marengo et al. |
| 2022/0176643 A1 | 6/2022 | Atsuta et al. |
| 2022/0234311 A1 | 7/2022 | Berastegui |
| 2022/0339868 A1 | 10/2022 | Stulc et al. |

FOREIGN PATENT DOCUMENTS

| | | |
|---|---|---|
| DE | 2007217 | 8/1970 |
| EP | 3368281 | 9/2018 |
| EP | 3368282 | 9/2018 |
| EP | 3368283 | 9/2018 |
| EP | 3380309 | 10/2018 |
| EP | 2780156 | 4/2019 |
| FR | 2999973 | 4/2015 |
| FR | 3044580 | 12/2017 |
| FR | 3051710 | 4/2019 |
| FR | 3096609 | 12/2020 |
| FR | 3097158 | 5/2021 |
| GB | 2556043 | 5/2018 |
| WO | 2022050942 | 3/2022 |

* cited by examiner

METHODS OF MANUFACTURE FOR COMPOSITE BLADES

FIELD

The present disclosure relates generally to gas turbine engines and, more particularly, to manufacturing methods for composite fan and compressor blades used with gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases to power the compressor and fan sections.

A gas turbine engine should be capable of ingesting foreign objects (e.g., birds in flight) while allowing for continued operation or safe and orderly shutdown of the engine. Further, blades in the gas turbine engine should be resistant to cracking due to nicks or dents caused by small debris such as sand or rain. To prevent damage on account of such small debris or foreign object ingestion and to meet such damage-prevention criteria, materials such as titanium alloys and fiber composites may be used to construct the fan or compressor blades.

The root section of composite blades typically includes a large volume of material during the manufacturing process to prevent ply distortion during a cure cycle, resulting in significant waste of material. Additionally, filler plies can be used to build up part of an airfoil geometry, which can generate undesired undulations in a laminate architecture of the composite blade.

SUMMARY

A method of manufacturing composite blades is disclosed herein. In various embodiments, the method comprises: laying up a pre-impregnated composite material to form a pre-impregnated composite structure, the pre-impregnated composite structure comprising a first pre-impregnated composite blade and a second pre-impregnated composite blade, the first pre-impregnated composite blade extending outward from an overlap portion to a first tip and defining a first pressure side and a first suction side, the second pre-impregnated composite blade extending outward from the overlap portion to a second tip and defining a second pressure side and a second suction side; vacuum bagging the pre-impregnated composite structure between a first pressure plate and a second pressure plate, the first pressure plate interfacing with the first pressure side of the first pre-impregnated composite blade and the second suction side of the second pre-impregnated composite blade, the second pressure plate interfacing with the second pressure side of the second pre-impregnated composite blade and the first suction side of the first pre-impregnated composite blade; consolidating and curing the pre-impregnated composite structure to form a fiber-reinforced composite structure; and machining the overlap portion of the fiber-reinforced composite structure to form a first fiber-reinforced composite blade and a second fiber-reinforced composite blade.

In various embodiments, the laying up of the pre-impregnated composite material includes laying up a portion of the pre-impregnated composite material continuously from the first tip over the overlap portion to the second tip.

In various embodiments, the pre-impregnated composite structure comprises a first side partially defined by a first leading edge of the first pre-impregnated composite blade and a first trailing edge of the second pre-impregnated composite blade. In various embodiments, the pre-impregnated composite structure comprises a second side partially defined by a second leading edge of the second pre-impregnated composite blade and trailing edge of the first pre-impregnated composite blade.

In various embodiments, the laying up of the pre-impregnated composite material includes laying up the pre-impregnated composite material on the first pressure plate.

In various embodiments, a first pressure surface of the first pressure plate mirrors a first surface of the pre-impregnated composite structure, the first surface at least partially defined by the first pressure side of the first pre-impregnated composite blade and the second suction side of the second pre-impregnated composite blade.

In various embodiments, the laying up of the pre-impregnated composite material includes automatically laying up the pre-impregnated composite material via advanced fiber placement.

In various embodiments, the pre-impregnated composite material comprises a thermoset resin and at least one of carbon fibers, insulating fibers, organic fibers, and inorganic fibers.

A method of consolidating a pre-impregnated composite structure to form a fiber-reinforced composite structure defining a first blade and a second blade is disclosed herein. In various embodiments, the method comprises: vacuum bagging the pre-impregnated composite structure between a first pressure plate and a second pressure plate to form a vacuum bagged structure, the pre-impregnated composite structure comprising an overlap portion, a first pre-impregnated composite blade, and a second pre-impregnated composite blade, the first pre-impregnated composite blade extending outward from the overlap portion from the overlap portion to a first tip of the first pre-impregnated composite blade, the second pre-impregnated composite blade extending outward from the overlap portion to a second tip of the second pre-impregnated composite blade, the first pressure plate interfacing with a first pressure side of the first pre-impregnated composite blade and a first suction side of the second pre-impregnated composite blade, the second pressure plate interfacing with a second pressure side of the second pre-impregnated composite blade and a second suction side of the first pre-impregnated composite blade; and pressurizing and heating the vacuum bagged structure to form the fiber-reinforced composite structure.

In various embodiments, a pressure from the pressurizing and heating is normalized across the pre-impregnated composite structure.

In various embodiments, the pre-impregnated composite structure comprises a first side partially defined by a first leading edge of the first pre-impregnated composite blade and a first trailing edge of the second pre-impregnated composite blade. In various embodiments, the pre-impregnated composite structure comprises a second side partially defined by a second leading edge of the second pre-impregnated composite blade and trailing edge of the first pre-impregnated composite blade.

In various embodiments, a first pressure surface of the first pressure plate mirrors a first surface of the pre-impregnated composite structure, the first surface at least partially defined by the first pressure side of the first pre-impregnated composite blade and the first suction side of the second pre-impregnated composite blade. In various embodiments, a second pressure surface of the second pressure plate mirrors a second surface of the pre-impregnated composite structure, the second surface at least partially defined by the second pressure side of the second pre-impregnated composite blade and the second suction side of the first pre-impregnated composite blade.

In various embodiments, the pre-impregnated composite material comprises a thermoset resin and at least one of carbon fibers, insulating fibers, organic fibers, and inorganic fibers.

A preform structure for manufacturing a first fiber-reenforced blade and a second fiber re-enforced blade. In various embodiments, the preform structure comprises: an overlap portion; a first pre-impregnated composite blade extending outward from a first root to a first tip, the first pre-impregnated composite blade defining a first leading edge, a first trailing edge, a first pressure side, and a first suction side; and a second pre-impregnated composite blade extending outward from a second root to a second tip, the second pre-impregnated composite blade defining a second leading edge, a second trailing edge, a second pressure side, and a second suction side, the first pressure side and the second suction side at least partially defining a first surface of the preform structure, the second pressure side and the first suction side at least partially defining a second surface of the preform structure.

In various embodiments, the preform structure comprises a thermoset resin and at least one of carbon fibers, insulating fibers, organic fibers, and inorganic fibers.

In various embodiments, a pre-impregnated composite material of the preform structure extends continuously from the first tip past the overlap portion to the second tip.

In various embodiments, the first leading edge and the second trailing edge at least partially define a first side of the preform structure. In various embodiments, the second leading edge and the first trailing edge at least partially define a second side of the preform structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In various embodiments, by combining two blade bodies in a predetermined position (i.e., a root-to-root/leading edge to trailing edge position) allows alignment of the individual ply directions, greatly reduces the material waste, and/or balances the applied pressure during the cure cycle. Additionally, in accordance with various embodiments, the positioning can enhance the efficiency of filler plies and subsequent architecture to improve laminate quality.

In various embodiments, positioning of the two blade bodies in a set orientation during the composite blade manufacturing process can enable balancing of pressure during the curing process. In various embodiments, positioning of the two blade bodies in the predetermined position during the composite blade manufacturing process can reduce a waste of material. In various embodiments, positioning of the two blade bodies in the predetermined position during the composite blade manufacturing process can enable improved laminate quality by reducing undulations. In various embodiments, positioning of the two blade bodies in the predetermined position during the composite blade manufacturing process can enable efficient ply layup and improved laminate quality.

Figure 1:
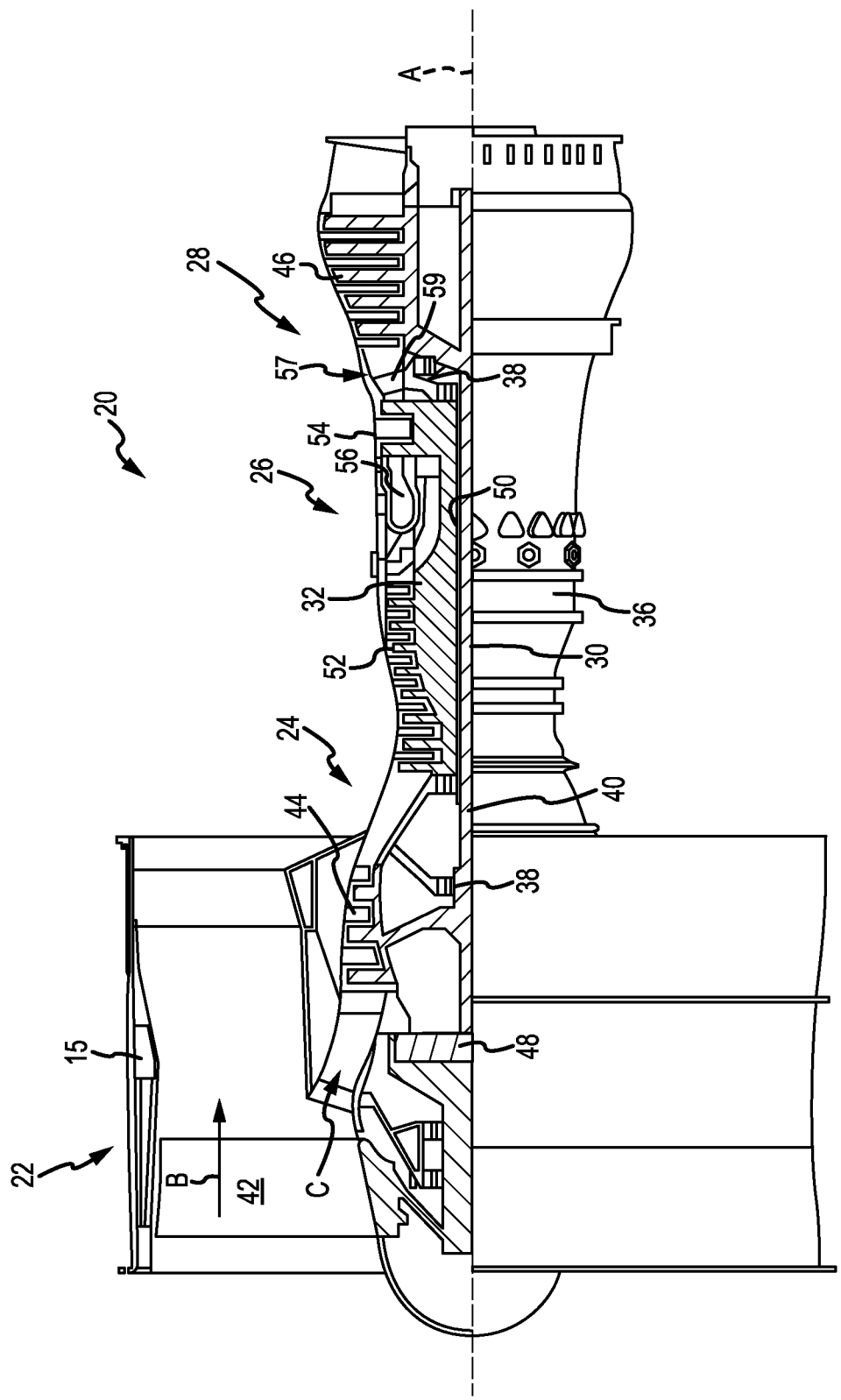
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans, as the teachings may be applied to other types of turbine engines, including three-spool architectures.

The gas turbine engine 20 generally includes a low-speed spool 30 and a high-speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low-speed spool 30 generally includes an inner shaft 40 that interconnects a fan 42, a low-pressure compressor 44 and a low-pressure turbine 46. The inner shaft 40 is connected to the fan 42 through a speed change mechanism, which in this gas turbine engine 20 is illustrated as a fan drive gear system 48 configured to drive the fan 42 at a lower speed than the low-speed spool 30. The high-speed spool 32 includes an outer shaft 50 that interconnects a high-pressure compressor 52 and a high-pressure turbine 54. A combustor 56 is arranged in the gas turbine engine 20 between the high-pressure compressor 52 and the high-pressure turbine 54. A mid-turbine frame 57 of the engine static structure 36 is arranged generally between the high-pressure turbine 54 and the low-pressure turbine 46 and may include airfoils 59 in the core flow path C for guiding the flow into the low-pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low-pressure compressor 44 and then the high-pressure compressor 52, mixed and burned with fuel in the combustor 56, and then expanded over the high-pressure turbine 54 and low-pressure turbine 46. The low-pressure turbine 46 and the high-pressure turbine 54 rotationally drive the respective low speed spool 30 and the high-speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2:
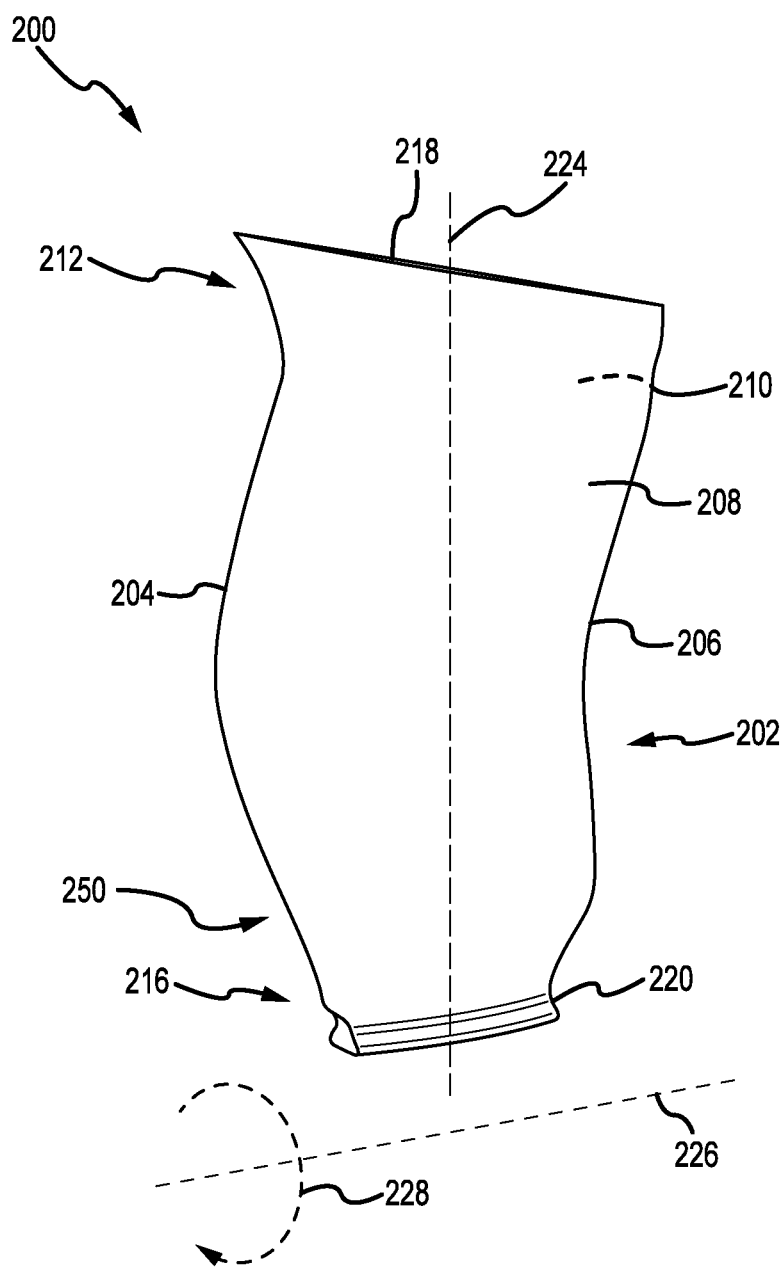
FIG. 2 is a schematic view of a fan blade, in accordance with various embodiments.

Referring now to FIG. 2, a fan blade 200 is illustrated, in accordance with various embodiments. The fan blade 200 is illustrative of one of a plurality of blades of the fan 42 within the fan section 22 described above with reference to FIG. 1.

In various embodiments, the fan blade 200 may be comprised of a composite material such as a fiber composite material and/or a fiber composite material infiltrated or impregnated with a resin, such as epoxy or other thermoset or a thermoplastic. The composite material of the fan blade 200 may comprise at least one of carbon fibers (including graphite fibers), such as polyacrylonitrile (PAN)-based carbon fibers, rayon-based carbon fibers, lignin-based carbon fibers, and pitch-based carbon fibers; insulating fibers, such as glass fiber; organic fibers, such as aramid fiber, para-aramid fiber, polyparaphenylene benzoxazole (PBO) fibers, polyphenylene sulfide fibers, polyester fibers, acrylic fibers, nylon fibers, and polyethylene fibers; and inorganic fibers, such as silicon carbide fibers and silicon nitride fibers; or a combination thereof impregnated with a resin (e.g., a thermoset resin). The thermoset resin may include a phenolic, methyl methacrylate, epoxy, polyurethane, polyester, and/or any other suitable thermoset resin. To form the fan blade 200, the fiber reinforced materials may be deposited using any suitable deposition method (e.g., hand layup, automated fiber placement (AFP), etc.), followed by one of autoclave molding or compression molding, as described further herein. The composite material may have improved vibration characteristics and may reduce the cost associated with tuning the blades. In that regard, the fan blade 200 may reduce the weight and cost of a gas turbine engine.

In various embodiments, the fan blade 200 includes an airfoil 202, having a leading edge 204, a trailing edge 206, a suction side 208 that is a generally convex surface, a pressure side 210 that is a generally concave surface, a tip region 212, an intermediate region 214 and a root region 216. In various embodiments, the tip region 212 includes a tip 218 and the root region includes a root 220. A radial axis 224 may extend generally along a spanwise direction from the root 220 to the tip 218 while a longitudinal axis 226 may extend generally in a fore and aft direction and define an axis of rotation about which the fan blade 200 rotates in a circumferential direction 228. In various embodiments, and as described further below, the fan blade 200 comprises a composite fan blade and manufactured via an improved manufacturing process. Although described herein as a fan blade, the present disclosure is not limited in this regard. For example, the manufacturing methods and systems disclosed herein can be used for manufacturing composite compressor blades or the like and still be within the scope of this disclosure.

Figure 3A:
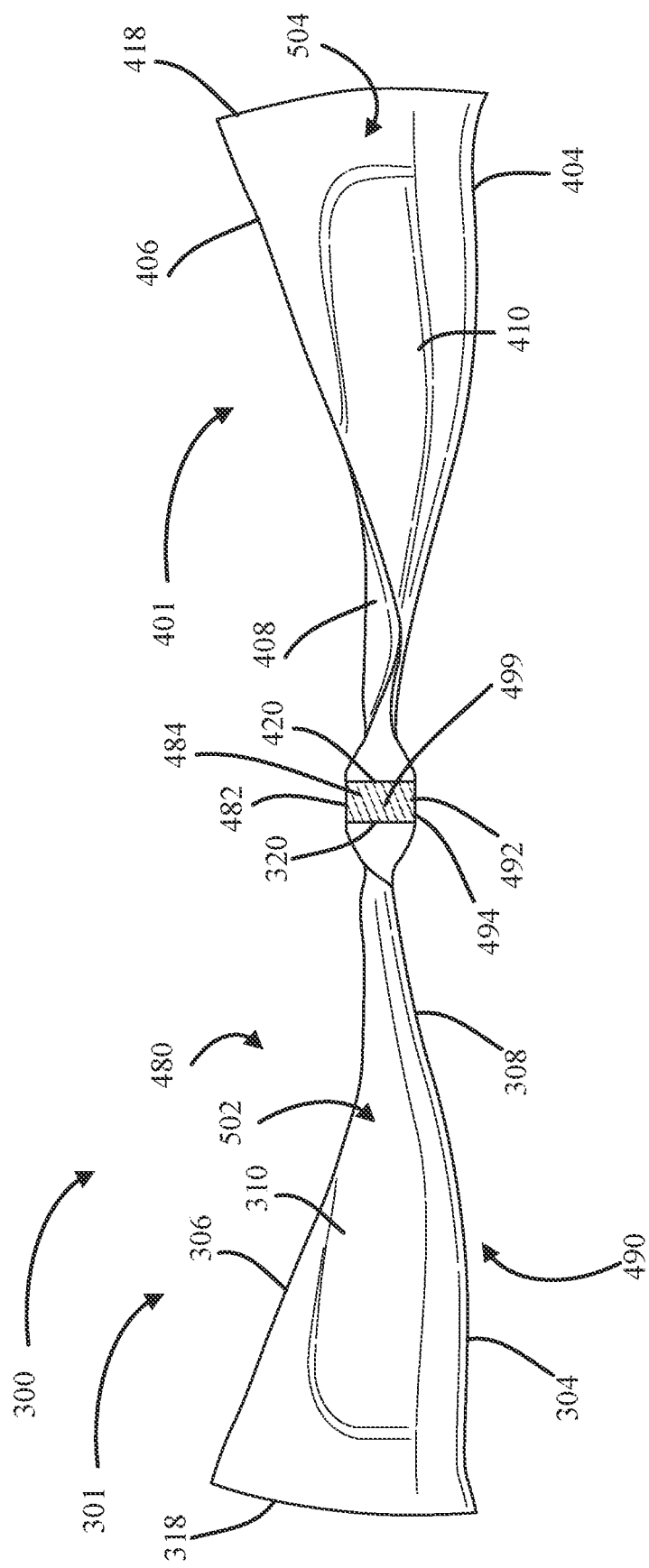
FIG. 3A illustrates an edge view of a pre-impregnated composite structure, in accordance with various embodiments.
Figure 3B:
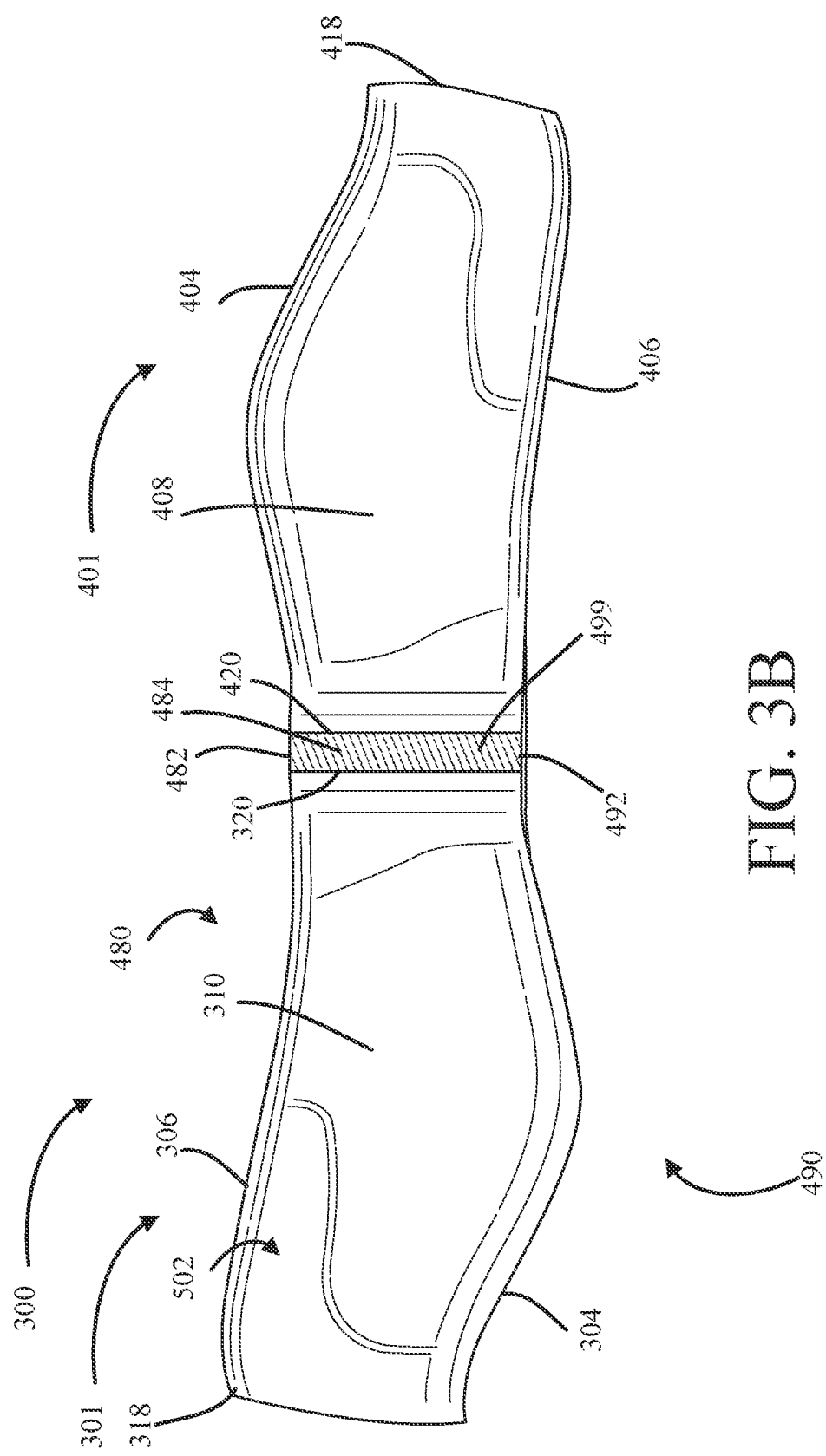
FIG. 3B illustrates a top view of a pre-impregnated composite structure, in accordance with various embodiments.

Referring now to FIGS. 3A and 3B, an edge view (FIG. 3A) and a top view (FIG. 3B) of a pre-impregnated ("pre-preg") composite structure 300 for use in a manufacturing process as described further herein is illustrated, in accordance with various embodiments. In various embodiments, the pre-preg composite structure 300 comprises a fiber composite material infiltrated or impregnated with a resin. The pre-preg composite structure 300 comprises a partially cured composite matrix. In this regard, the pre-preg composite structure 300 is an intermediate structure (i.e., made during) a manufacturing process of a blade (e.g., a fan blade 200 from FIG. 2 or a compressor blade from compressor section 24 in FIG. 1), in accordance with various embodiments.

In various embodiments, the pre-preg composite structure 300 comprises a first pre-preg composite blade 301, a second pre-preg composite blade 401, and an overlap portion 499. In various embodiments, the overlap portion 499 extends from a root 320 of the first pre-preg composite blade 301 to a root 420 of the second pre-preg composite blade 401. In the edge view of FIG. 3A, the pre-preg composite structure 300 extends into the page from a side with a leading edge 304 of a first pre-preg composite blade 301 and a trailing edge 406 of the second pre-preg composite blade 401 into the page to a second side with the trailing edge 306 of the first pre-preg composite blade 301 and the leading edge 404 of the second pre-preg composite blade 401.

Each pre-preg composite blade (e.g., first pre-preg composite blade 401 and second pre-preg composite blade 401) extends outward from a respective root to a respective tip (i.e., first pre-preg composite blade 301 extends outward from the root 320 to a tip 318 and the second pre-preg composite blade 401 extends outward from the root 420 to a tip 418). Each pre-preg composite blade further comprises a leading edge and a trailing edge (i.e., the first pre-preg composite blade 301 comprises a leading edge 304 and a trailing edge 306 and the second pre-preg composite blade 401 comprises a leading edge 404 and a trailing edge 406). Each pre-preg composite blade further comprises a pressure side and a suction side (i.e., the first pre-preg composite blade 301 comprises a pressure side 310 and a suction side 308 and the second pre-preg composite blade 401 comprises a pressure side 410 and a suction side 408).

In various embodiments, a front side 490 of the pre-preg composite structure 300 is defined by the leading edge 304 of the first-pre-preg composite blade 301, a front side 492 of the overlap portion 499, and the trailing edge 406 of the second pre-preg composite blade 401. Similarly, a back side 480 of the pre-preg composite structure 300 is defined by the trailing edge 306 of the first pre-preg composite blade 301, a back side 482 of the overlap portion 499, and the leading edge of the 408 of the second pre-preg composite blade 401.

In various embodiments, as described further herein, during a consolidation process, a first pressure side 502 of the pre-preg composite structure 300 is defined at least partially by the pressure side 310 of the first pre-preg composite blade 301, a first pressure side 484 of the overlap portion 499, and the suction side 408 of the second pre-preg composite blade 401. Similarly, a second pressure side 504 during a consolidation process of the pre-preg composite structure 300 is at least partially defined by the suction side 308 of the first pre-preg composite blade 301, a second pressure side 494 of the overlap portion 499, and the pressure side 410 of the second pre-preg composite blade 401. In the top view of FIG. 3B, the view is of the first pressure side 502 with the second pressure side 504 being opposite the first pressure side 502, as shown in FIG. 3A.

In various embodiments, elements of the pre-preg composite blades 301, 401 correspond to elements of a blade being manufactured (e.g., fan blade 200) in accordance with the processes described further herein. For example, the leading edges 304, 404 correspond to the leading edge 204 of the fan blade 200, the trailing edges 306, 406 correspond to the trailing edge 206 of the fan blade 200, the suction sides 308, 408 correspond to the suction side 208 of the fan blade 200, the pressure sides 310, 410 correspond to the pressure side 210 of the fan blade 200, the roots 320, 420 correspond to the root 220 of the fan blade 200, the tips 318, 418 correspond to the tip 218 of the fan blade 200. In this regard, two of the fan blade 200 can be manufactured simultaneously by the process described further herein with the pre-preg composite structure 300, in accordance with various embodiments.

Referring now to FIG. 4A, a portion of a system 500 for consolidating the pre-preg composite structure 300 from FIGS. 3A and 3B is illustrated, in accordance with various embodiments. In various embodiments, the consolidation process of the pre-preg composite structure 300 can comprise an autoclave process or a compression molding process. Although described herein with an autoclave process, the autoclave system is meant to be exemplary and not limiting in any manner. Thus, although described with respect to an autoclave process, any consolidation process known in the art is within the scope of this disclosure.

Figure 4:
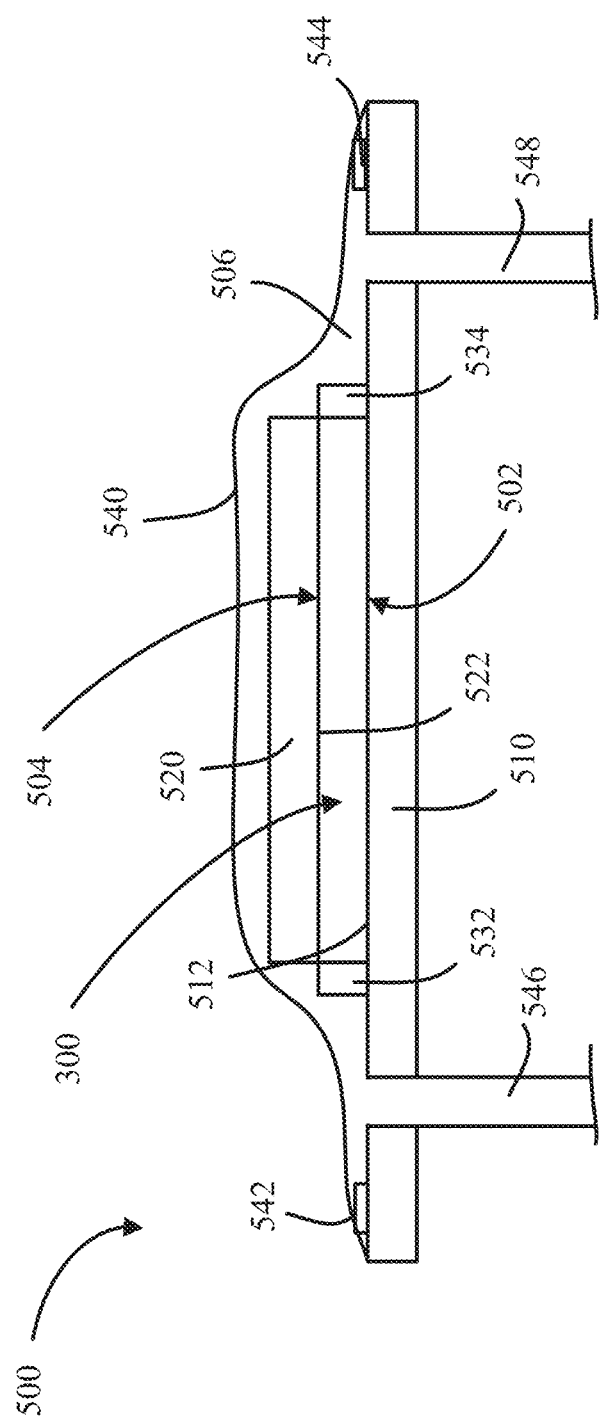
FIG. 4 illustrates a portion of a system for consolidating a pre-impregnated composite structure, in accordance with various embodiments.

In various embodiments, during the autoclave process as shown in FIG. 4, the pre-preg composite structure 300 is disposed between a first pressure plate 510 and a second pressure plate 520. A first pressure surface 512 of the first pressure plate 510 interfaces with the first pressure side 502 of the pre-preg composite structure 300. Similarly, a second pressure surface 522 of the second pressure plate 520 interfaces with the second pressure side 504. The first pressure surface 512 of the first pressure plate 510 mirrors the first pressure side 502 of the pre-preg composite structure 300. Similarly, the second pressure surface 522 of the second pressure plate 520 mirrors the second pressure side 504 of the pre-preg composite structure 300. In this regard, during the autoclave process described further herein, the pre-preg composite structure 300 is exposed to a clamping force between the first pressure plate 510 and the second pressure plate 520 to consolidate the pre-preg composite structure 300 into a fiber-reinforced composite structure as described further herein.

In various embodiments, the system for consolidation can comprise edge dams 532, 534 to prevent the tips 318, 418 of the pre-preg composite blades 301, 401 from FIG. 3A, 3B from being pushed outward during the consolidation process. In various embodiments, the pressure plates 510, 520, and the pre-preg composite structure 300 are placed under a vacuum (e.g., via a vacuum bag 540 that can be sealed via seals 542, 544, and be in fluid communication with a vacuum via conduits 546, 548.

In various embodiments, the vacuum bagged system of FIG. 4 is disposed in an autoclave system with an autoclave wall 550 to provide additional pressure between the pressure plates 510, 520 to provide greater pressure during the consolidation process. For example, the vacuum bagging system of FIG. 4 can provide a consolidation pressure of approximately 30 pounds per square inch (psi), whereas the autoclave process can provide an addition 200 psi of pressure for a total pressure applied between the first pressure side 502 and the second pressure side 504 of the pre-preg composite structure 300 as shown in FIG. 3 to approximately 230 psi. In various embodiments, "vacuum bagging", as described further herein, refers to creating a vacuum within a cavity 506 having the pre-preg composite structure 300 disposed therein and the vacuum creates a consistent pressure on the second pressure plate 420. Although illustrated as being disposed only around the second pressure plate 520, the present disclosure is not limited in this regard. For example, an embodiment where the vacuum bag encloses the first pressure plate 510 and the second pressure plate 520 is within the scope of this disclosure. In various embodiments, the vacuum environment within the cavity 506 is created by a vacuum in fluid communication with the conduits 546, 548.

In various embodiments, during the autoclave wall 550 comprises a pressure inlet 552 that is configured to create a pressurized environment within a cavity 554 defined by the autoclave wall 550. During the autoclave consolidation process as shown in FIG. 5, the cavity 554 defined by the autoclave wall 550 is pressurized and heated to facilitate consolidation of the pre-preg composite structure 300 into a fiber-reinforced composite structure.

Figure 6:
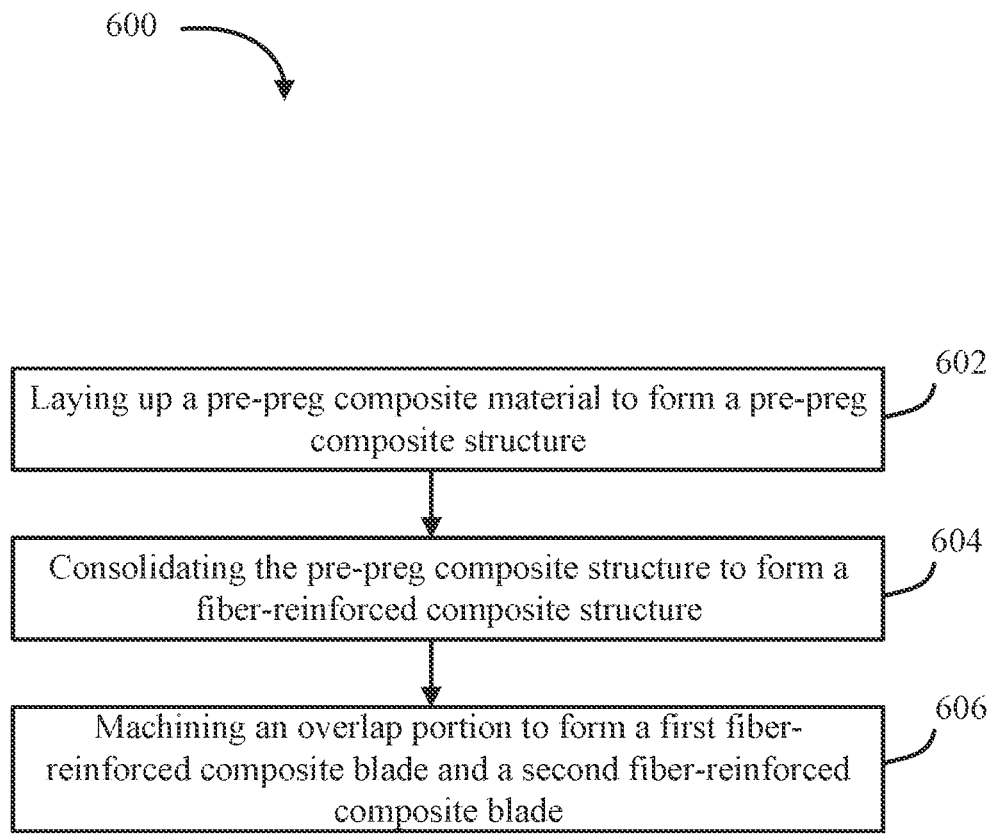
FIG. 6 illustrates a manufacturing process for multiple composite blades, in accordance with various embodiments.

Referring now to FIG. 6, a method 600 for manufacturing composite blades is illustrated, in accordance with various embodiments. The method 600 comprises laying up a pre-preg composite material to form a pre-preg composite structure (step 602). In various embodiments, the laying up can be performed manually (e.g., by hand) or via an automated process (e.g., an advanced fiber placement ("AFP") process). In various embodiments, the pre-preg composite structure formed from step 602 is the pre-preg composite structure 300 from FIGS. 3A, 3B. In various embodiments, with brief reference to FIGS. 3A and 3B, by having a pre-preg composite structure 300 that includes two blade preforms (i.e., first pre-preg composite blade 301 and second pre-preg composite blade 401) and an overlap portion 499 in the orientation as shown in FIGS. 3A and 3B, facilitates a continuous fiber placement during step 602 from the tip 318 of the first pre-preg composite blade 301 across the overlap portion 499 to the tip 418 of the second pre-preg composite blade 401, back and forth across the overlap portion. In this regard, based on the orientation, the pre-preg composite blades 301, 401 can maintain tolerances of the blade being manufactured (e.g., fan blade 200 from FIG. 2), and the layup step can be significantly quicker relative to alternative configurations or configurations that only lay up a single blade at one time.

Figure 5:
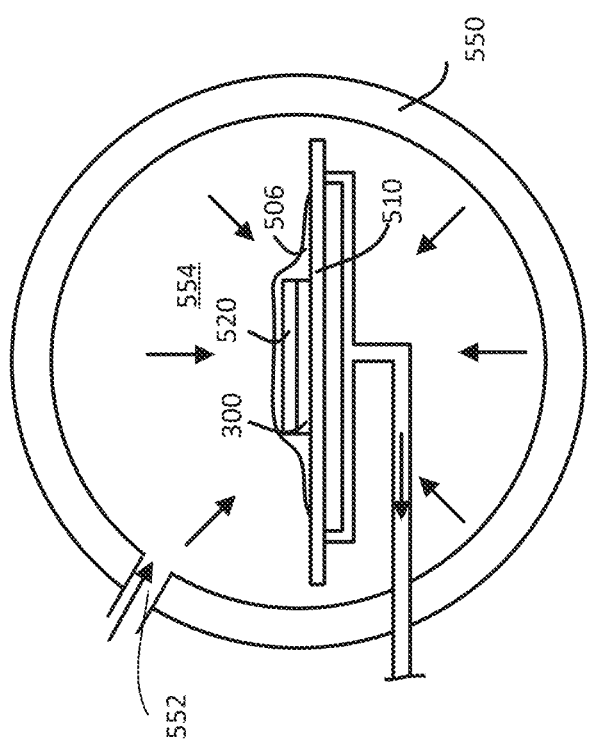
FIG. 5 illustrates a system for consolidating a pre-impregnated composite structure, in accordance with various embodiments.

In various embodiments, the laying up step (i.e., step 602) comprises laying up the pre-preg composite material on a first pressure plate (e.g., first pressure plate 510 from FIGS. 4 and 5). In this regard the first pressure plate has a first pressure surface as described with respect to FIG. 4 that mirrors the first pressure side 502 of the pre-preg composite structure 300 from FIGS. 3A and 3B. Accordingly, the first pressure plate is configured to act as a mold to mold the pre-preg composite material into the pre-preg composite structure 300 from FIGS. 3A and 3B as described previously herein.

In various embodiments, the method 600 further comprises consolidating the pre-preg composite structure to form a fiber-reinforced composite structure (step 604). Although described herein as comprising an autoclave process (e.g., as shown in FIGS. 4 and 5), the present disclosure is not limited in this regard. For example, the consolidation process can comprise a hydraulic press, compression molding, or any other consolidation process and be within the scope of this disclosure. In various embodiments, by having a pre-preg composite structure 300 oriented as shown in FIGS. 3A and 3B, a pressure is normalized throughout the pre-preg composite structure 300 during the consolidation process. For example, for only a single blade consolidated as described previously herein, resin from the pre-preg composite material can be driven towards a root of the blade due to pressure not being normalized across the entire structure. In contrast, the pre-preg composite structure 300 being oriented as described previously herein, and as shown in FIGS. 3A and 3B allows a pressure applied the first pressure side 502 counterbalances the pressure applied to the pressure side 310 of the first pre-preg composite blade 301 with the pressure being applied to the suction side 408 of the second pre-preg composite blade 401, which can result in the resin being driven normal to each local pressure point, in accordance with various embodiments.

In various embodiments, after the consolidation step (i.e., step 604), the method 600 further comprises machining an overlap portion (i.e., overlap portion 499 from FIGS. 3A and 3B) to form a first fiber re-enforced composite blade and a second fiber-reinforced composite blade (step 606). In various embodiments, the first fiber-reenforced composite blade and the second fiber-reinforced composite blade are in accordance with a blade (e.g., fan blade 200) that is being manufactured. In this regard, both the first fiber-reenforced composite blade and the second fiber-reenforced composite blade are within tolerances of a design model of a blade being manufactured, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

What is claimed is:

1. A method of manufacturing composite gas turbine engine blades, the method comprising:
   laying up a pre-impregnated composite material to form a continuous pre-impregnated composite structure, the continuous pre-impregnated composite structure comprising a first pre-impregnated composite gas turbine engine blade and a second pre-impregnated composite gas turbine engine blade, the first pre-impregnated composite gas turbine engine blade extending outward from an overlap portion to a first tip and defining a first pressure side and a first suction side, the second pre-impregnated composite gas turbine engine blade extending outward from the overlap portion to a second tip and defining a second pressure side and a second suction side;

vacuum bagging the continuous pre-impregnated composite structure between a first pressure plate and a second pressure plate, the first pressure plate interfacing with the first pressure side of the first pre-impregnated composite gas turbine engine blade and the second suction side of the second pre-impregnated composite gas turbine engine blade, the second pressure plate interfacing with the second pressure side of the second pre-impregnated composite gas turbine engine blade and the first suction side of the first pre-impregnated composite gas turbine engine blade;

consolidating then curing the continuous pre-impregnated composite structure to form a fiber-reinforced composite structure; and machining the overlap portion of the fiber-reinforced composite structure to form a first fiber-reinforced composite gas turbine engine blade and a second fiber-reinforced composite gas turbine engine blade.

2. The method of claim 1, wherein the laying up of the pre-impregnated composite material includes laying up a portion of the pre-impregnated composite material continuously from the first tip over the overlap portion to the second tip.

3. The method of claim 1, wherein the continuous pre-impregnated composite structure comprises a first side partially defined by a first leading edge of the first pre-impregnated composite gas turbine engine blade and a first trailing edge of the second pre-impregnated composite gas turbine engine blade.

4. The method of claim 3, wherein the continuous pre-impregnated composite structure comprises a second side partially defined by a second leading edge of the second pre-impregnated composite gas turbine engine blade and trailing edge of the first pre-impregnated composite gas turbine engine blade.

5. The method of claim 1, wherein the laying up of the pre-impregnated composite material includes laying up the pre-impregnated composite material on the first pressure plate.

6. The method of claim 1, wherein a first pressure surface of the first pressure plate mirrors a first surface of the continuous pre-impregnated composite structure, the first surface at least partially defined by the first pressure side of the first pre-impregnated composite gas turbine engine blade and the second suction side of the second pre-impregnated composite gas turbine engine blade.

7. The method of claim 1, wherein the laying up of the pre-impregnated composite material includes automatically laying up the pre-impregnated composite material via advanced fiber placement.

8. The method of claim 1, wherein the pre-impregnated composite material comprises a thermoset resin and at least one of carbon fibers, insulating fibers, organic fibers, and inorganic fibers.

9. The method of claim 1, wherein the continuous pre-impregnated composite structure has a continuous fiber placement from a first tip of a first pre-impregnated composite gas turbine engine blade to a second pre-impregnated composite gas turbine engine blade.

10. A method of consolidating a continuous pre-impregnated composite structure to form a fiber-reinforced composite structure defining a first blade and a second blade, the method comprising:

vacuum bagging the continuous pre-impregnated composite structure between a first pressure plate and a second pressure plate to form a vacuum bagged structure, the continuous pre-impregnated composite structure comprising an overlap portion, a first pre-impregnated composite gas turbine engine blade, and a second pre-impregnated composite gas turbine engine blade, the first pre-impregnated composite gas turbine engine blade extending outward from the overlap portion from the overlap portion to a first tip of the first pre-impregnated composite gas turbine engine blade, the second pre-impregnated composite gas turbine engine blade extending outward from the overlap portion to a second tip of the second pre-impregnated composite gas turbine engine blade, the first pressure plate interfacing with a first pressure side of the first pre-impregnated composite gas turbine engine blade and a first suction side of the second pre-impregnated composite gas turbine engine blade, the second pressure plate interfacing with a second pressure side of the second pre-impregnated composite gas turbine engine blade and a second suction side of the first pre-impregnated composite gas turbine engine blade;

pressurizing and heating the vacuum bagged structure to form the fiber-reinforced composite structure; and machining the overlap portion of the fiber-reinforced composite structure.

11. The method of claim 10, wherein a pressure from the pressurizing and heating is normalized across the continuous pre-impregnated composite structure and the pressure is at least 230 psi.

12. The method of claim 10, wherein the continuous pre-impregnated composite structure comprises a first side partially defined by a first leading edge of the first pre-impregnated composite gas turbine engine blade and a first trailing edge of the second pre-impregnated composite gas turbine engine blade.

13. The method of claim 12, wherein the continuous pre-impregnated composite structure comprises a second side partially defined by a second leading edge of the second pre-impregnated composite gas turbine engine blade and trailing edge of the first pre-impregnated composite gas turbine engine blade.

14. The method of claim 10, wherein a first pressure surface of the first pressure plate mirrors a first surface of the continuous pre-impregnated composite structure, the first surface at least partially defined by the first pressure side of the first pre-impregnated composite gas turbine engine blade and the first suction side of the second pre-impregnated composite gas turbine engine blade.

15. The method of claim 14, wherein a second pressure surface of the second pressure plate mirrors a second surface of the continuous pre-impregnated composite structure, the second surface at least partially defined by the second pressure side of the second pre-impregnated composite gas turbine engine blade and the second suction side of the first pre-impregnated composite gas turbine engine blade.

16. The method of claim 10, wherein the pre-impregnated composite material comprises a thermoset resin and at least one of carbon fibers, insulating fibers, organic fibers, and inorganic fibers.

17. The method of claim 10, wherein the continuous pre-impregnated composite structure has a continuous fiber placement from a first tip of a first pre-impregnated composite gas turbine engine blade to a second pre-impregnated composite gas turbine engine blade.

\* \* \* \* \*